No. 763,643. PATENTED JUNE 28, 1904.
E. R. STODDARD.
VALVE.
APPLICATION FILED AUG. 15, 1903.
NO MODEL.

WITNESSES.
L. E. Flanders
T. S. Longstaff

INVENTOR.
Edgar R. Stoddard
By Bartlett & Bartlett
Attorneys.

No. 763,643.　　　　　　　　　　　　　　　　　　　　Patented June 28, 1904.

UNITED STATES PATENT OFFICE.

EDGAR R. STODDARD, OF DETROIT, MICHIGAN.

VALVE.

SPECIFICATION forming part of Letters Patent No. 763,643, dated June 28, 1904.

Application filed August 15, 1903. Serial No. 169,569. (No model.)

*To all whom it may concern:*

Be it known that I, EDGAR R. STODDARD, a citizen of the United States of America, residing at Detroit, in the county of Wayne and State of Michigan, have invented certain new and useful Improvements in Valves, of which the following is a specification, reference being had therein to the accompanying drawings.

This invention relates to improvements in valves, and especially to valves for use in hydraulic systems, as in the hydrants and other parts of the system where valves of this character would be practical; and the primary object of the invention is to provide a valve which is so perfectly balanced that no matter how great the pressure may be it will not interfere with the opening or closing of the valve and in which the coupling-nozzle shall be a stationary member.

It is also an object of the invention to so construct the valve that the working parts may be readily removed without removing the entire valve for the purpose of putting in new packing or for repair should the parts become damaged by reason of a wagon striking the nozzle and that no particular skill shall be required to apply it to a hydrant or other structure.

A further object of the invention is to provide a quick-opening valve which is simple in construction, cheap, durable, and efficient and to provide the same with certain other new and useful features, all as hereinafter more fully described, reference being had to the accompanying drawings, in which—

Figure 1:
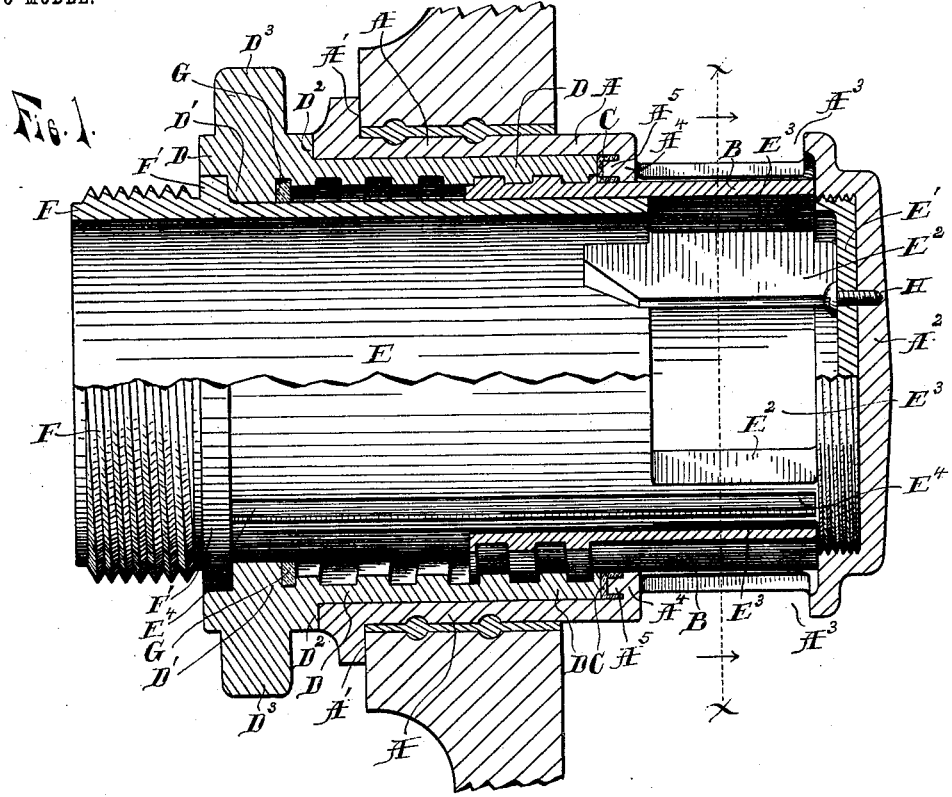
Figure 2:
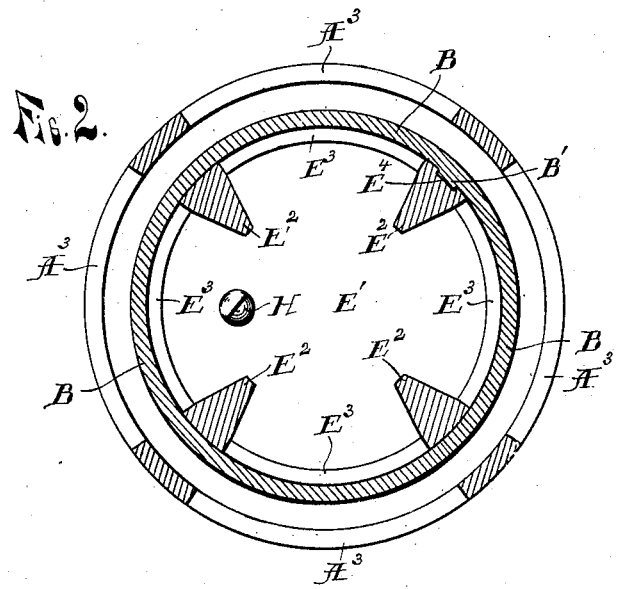

Figure 1 is a longitudinal section of a device embodying the invention with some of the parts partially in elevation, and Fig. 2 is a section of the same on the line $x\,x$ of Fig. 1.

As shown in the drawings, A is a cylindrical shell or casing adapted to be inserted in a suitable opening in the wall of a hydrant or other structure and secured therein by forming a fused-metal joint or by any other suitable means, a shoulder A' being formed on the outer end of the shell to engage the face of the wall. The shell A is formed with a solid inner end or head $A^2$, and in the side of the shell within the hydrant are openings $A^3$ for the escape of the water, which openings are closed by a longitudinally-movable sleeve B, forming the valve member. An inwardly-projecting annular ledge $A^4$ on the shell adjacent to the openings $A^3$ engages the outer side of the valve member and is formed with a laterally-projecting rib $A^5$ to engage and hold a packing-ring C, against which packing the inner end of the rotatable sleeve D abuts, said sleeve being formed with an internal screw-thread to engage a like thread on the outer end of the valve member B.

Fitting within the valve member is an inner stationary cylindrical member E, formed with a head E', which is externally screw-threaded to engage an internally-screw-threaded socket in the head $A^2$ of the shell, and ribs $E^2$ connect the head and body of the member E, thus forming openings $E^3$ between said ribs, which openings are opposite the openings $A^3$, so that when the valve member is withdrawn from over the openings the water will pass through said openings and out through the inner member. In the face of the inner member E is a longitudinally-extending groove $E^4$, and on the valve member is a rib B' to engage said groove and prevent the valve member from turning.

When the valve is used in a hydrant, as shown, the outer end of the inner member is externally screw-threaded to form a nipple F for the attachment of the hose connection, and a flange or integral collar F' on said inner member at the end of said thread engages an inwardly-projecting rib D' at the outer end of the sleeve D, which sleeve is held from longitudinal movement by said flange F' and by the engagement of its shoulder $D^2$ with the outer end of the shell. Lugs $D^3$ are provided on said sleeve for the engagement of a spanner-wrench to turn the sleeve, and lying within the sleeve against the side of the rib D' opposite that engaged by the flange F' is a packing-ring G, against which the outer end of the valve member abuts when the valve is fully opened to prevent any leakage.

To provide against the possibility of the inner member being turned when the hose is attached or detached, and thus disconnecting said member from the shell, a screw H is run through the head or end E' of said member from the inside into the head A² of the shell.

A seat is formed on the head A² of the shell for the inner end of the valve member, and as the water-pressure can come only on the sides of the valve and is equal on all sides the pressure on one side balances that on the other, and therefore no matter how heavy the pressure may be it will not interfere with the opening or closing of the valve.

With this construction of valve the hose is attached in the ordinary manner to the stationary hose-nozzle, and the valve is easily and quickly opened by turning the sleeve D, as the threads connecting the sleeve and valve member have but very few turns to the inch and are heavy square threads. The sleeve D, valve member B, and inner or nozzle member E may all be quickly and easily removed for repair or repacking without removing the outer member or shell by simply removing the screw H and with a special wrench, which is inserted in the inner member and engaged with the ribs E², turn said member to disconnect it from the head of the shell, when all may be pulled out.

It is obvious that this construction of valve is adapted for use in many places other than hydrants, a hydrant-valve having been shown in the drawings as being most convenient, and they may be made any desired size according to their use. It will also be noticed that in this construction of valve there is no right side up and by reason of being entirely self-contained is always in perfect alinement no matter how set into the hydrant or other casing.

Having thus fully described my invention, what I claim is—

1. In a valve, the combination of an outer cylindrical shell closed at one end and having openings in its side, an inner cylindrical valve member open at each end and adapted to engage the closed end of the shell at its inner end and close said openings, and means for moving said valve member longitudinally.

2. In a valve, the combination of an inner tubular member having a closed end and openings in its sides, a tubular valve member longitudinally movable upon the inner member to close said openings, and means for moving said valve member.

3. In a valve, the combination of a shell having a closed end and openings in its side, an inner member secured to said shell and having openings in its side, a longitudinally-movable valve member interposed between the shell and inner member, and means for moving said valve member longitudinally.

4. In a valve, the combination of an outer shell and an inner tubular member closed at their inner ends and provided with openings in their sides, and a longitudinally-movable valve member interposed between said outer shell and inner member to close said openings.

5. In a valve, the combination of an outer shell and an inner tubular member closed at their inner ends, and provided with openings in their sides, a longitudinally-movable valve member interposed between said outer shell and inner member to close said openings, means for preventing rotation of said valve member, a rotatable sleeve, and means whereby the valve member is moved longitudinally by the rotation of said sleeve.

6. In a valve of the character described, the combination with an outer shell having a closed end and openings in its side, of an inner tubular member secured at one end to the closed end of the shell and having openings in its side, a longitudinally-movable valve member sleeved on the inner member and provided with an external screw-thread at one end, an inwardly-projecting ledge on the shell engaging the valve member, a rotatable sleeve internally screw-threaded to engage the screw-thread on the valve member and extending outside the shell, and a packing-ring interposed between the end of the sleeve and the ledge.

7. In a valve of the character described, the combination of an outer shell having openings in its side and a closed end formed with an internally-screw-threaded socket, an inner tubular member engaging said socket at one end and having openings opposite the openings in the shell and a longitudinal groove, a valve member sleeved on said inner member and adapted to be moved longitudinally to engage at one end a seat on the shell and close the openings and provided with external screw-threads at its opposite end, a rib on the valve member to engage the groove in the inner member, an inwardly-projecting ledge on the shell adjacent to the openings therein and engaging the valve member, a rotatable sleeve within the shell having an internal screw-thread engaging the screw-thread on the valve member and an inwardly-projecting rib, a packing-ring engaging one side of said rib, and a packing-ring interposed between the end of the sleeve and the ledge.

8. In a valve of the character described, the combination of an outer shell having a shoulder adapted to engage the outer side of the wall into which the valve is inserted and provided with openings in its side, a head on the inner end of said shell formed with a valve-seat and an internally-screw-threaded socket, an inner tubular member externally screw-threaded at one end to engage said socket and provided with openings and a longitudinal groove, a valve member sleeved on the inner member to move longitudinally therein into engagement with the seat on the head and provided with an external screw-thread at one end, a rib on said valve member to engage the groove in the inner member, a ledge extending inward from the shell and engaging the valve member, a rotatable sleeeve having an internal screw-thread to engage the screw-thread on the valve member and formed with a shoulder to engage the outer end of the shell, an inwardly-projecting rib on said sleeve, an outwardly-projecting flange on the inner member engaging said inwardly-projecting rib, a packing-ring in engagement with the opposite side of said rib, and a packing-ring interposed between the inner end of said sleeve and the ledge on the shell.

In testimony whereof I affix my signature i presence of two witnesses.

EDGAR R. STODDARD.

Witnesses:
OTTO F. BARTHEL,
LEWIS E. FLANDERS.